United States Patent [19]
Kakinuma et al.

[11] Patent Number: 5,101,856
[45] Date of Patent: Apr. 7, 1992

[54] ELECTROMAGNETIC DIRECTIONAL CONTROL VALVE

[75] Inventors: Toshifumi Kakinuma, Sano; Kiyoshi Hayashi, Tatebayashi, both of Japan

[73] Assignee: Tokyo Keiki Company Ltd., Tokyo, Japan

[21] Appl. No.: 569,281

[22] Filed: Jun. 28, 1990

Related U.S. Application Data

[62] Division of Ser. No. 331,381, Mar. 31, 1989, Pat. No. 4,953,590.

[30] Foreign Application Priority Data

| Apr. 22, 1988 | [JP] | Japan | 63-099495 |
| May 12, 1988 | [JP] | Japan | 63-115129 |
| Jun. 17, 1988 | [JP] | Japan | 63-149293 |

[51] Int. Cl.⁵ .................. F15B 14/044; F16K 37/00
[52] U.S. Cl. .................. 137/554; 137/625.65; 251/129.1
[58] Field of Search .................. 137/554, 625.65; 251/129.1

[56] References Cited

U.S. PATENT DOCUMENTS

| 3,789,876 | 2/1974 | Kempton et al. |
| 4,004,258 | 1/1977 | Arnold |
| 4,308,891 | 1/1982 | Loup |
| 4,418,720 | 12/1983 | Day et al. |
| 4,794,948 | 1/1989 | Schempp |
| 4,809,742 | 3/1989 | Grau |
| 4,825,904 | 5/1989 | Grau |

FOREIGN PATENT DOCUMENTS

57-163782 10/1982 Japan.

*Primary Examiner*—Gerald A. Michalsky
*Attorney, Agent, or Firm*—Wenderoth, Lind & Ponack

[57] ABSTRACT

A spool of a valve main body is switched and driven by exciting a solenoid coil by supplying a DC or AC voltage. An intensity of the magnetism generated by the excitation of the solenoid coil is detected by a magnetic sensor. When a predetermined sensor output is obtained, an indicator lamp is lit to indicate that the spool has operated correctly. The intensity of the magnetism due to the DC excitation is detected by magnetoresistive devices. The intensity of magnetism due to the AC excitation is detected by a pickup coil or a current transformer.

4 Claims, 10 Drawing Sheets

ELECTROMAGNETIC DIRECTIONAL CONTROL VALVE

This application is a division of application Ser. No. 331,381, filed on Mar. 31, 1989, now U.S. Pat. No. 4,953,590.

BACKGROUND OF THE INVENTION

The present invention relates to an electromagnetic directional control valve for transferring the motion of an iron core, movable upon excitation of a solenoid coil, to a spool and for switching between fluid passages of a valve main body and, more particularly, to an electromagnetic directional control valve for detecting whether a magnetic field which drives the movable iron core has been generated by the application of a DC voltage to the solenoid coil.

FIG. 1 shows a cross sectional view of a conventional electromagnetic directional control valve.

In FIG. 1, reference numeral 10 denotes a valve main body operable for switching between fluid passages; 12 indicates an electrical equipment box to which a cable for supplying an electric signal from the outside is connected; and 14 represents a solenoid section.

A spool 16 is assembled into the valve main body 10 so as to be slidable in the axial direction. The spool 16 is held at the neutral position shown in the diagram by springs 18-1 and 18-2 arranged on both sides of the spool 16. The passage in the valve main body 10 can be switched by moving the spool 16 to the right or left of the neutral position.

The solenoid portion 14 arranged on the left side of the valve main body 10 has a casing 20 made of a synthetic resin material. A coil 22 is assembled in the casing 20. The coil 22 is enclosed in a box-shaped coil frame 26 made of a permeable material in a state in which the coil is wound around a coil bobbin 23. A core tube 25 is provided in the coil frame 26. A movable iron core 24 is assembled in the core tube 25 so as to be movable in the axial direction. A fixed iron core 28 is arranged and fixed on the right side of the movable iron core 24 at a predetermined distance therefrom. A through hole is formed in the fixed iron core 28 in the axial direction. A push pin 30-2 is pierced into the through hole. The right end of the push pin 30-2 is coupled with the spool 16 and the left end is coupled with the movable iron core 24.

The right end of the core tube 25 is fitted into the hole formed in the edge surface of the valve main body 10 and is fixed by attaching a flange 35 to the valve main body 10 by using a screw 37. On the other hand, a plug 27 is fitted from the inside of the core tube 25 into the hole formed therein on the left side of the core tube, thereby closing the left side of the core tube.

A terminal plate 32 is provided in the electrical equipment box 12 attached on the valve main body 10. The cable led in from the outside is connected to a terminal of the terminal plate 32. A DC voltage is applied to the coil 22 provided in the solenoid section 14 through a signal line from the terminal plate 22, thereby exciting the coil.

An indicator lamp 34 which can be observed from the outside is also provided in the box 12. When a DC voltage is applied from the outside to excite the coil 22, the indicator lamp 34 is lit to indicate that the electromagnetic valve has operated.

According to the operation of such a conventional electromagnetic direction control valve, when the coil 22 of the solenoid section 14 is excited by supplying a DC power source from the outside, the movable iron core 24 is driven to the right by the magnetic field generated from the coil 22. The spool 16 is pushed by the push pin 30-2, thereby switching the passage in the valve main body 10.

At this time, the indicator lamp 34 provided in the electrical equipment box 12 is lit to indicate the operation of the electromagnetic directional control valve. However, even if the indicator lamp 34 is lit, it is impossible to check whether the coil 22 had actually been excited and the spool 16 actually moved.

To check whether the spool 16 has been moved to the correct position or not by the excitation of the coil 22 as mentioned above, hitherto, a microswitch 38 has been provided in a cover 36 on the right side of the valve main body 10. A push pin 30-1 coupled to the right side of the spool 16 is arranged so as to face a switch knob 40 of the microswitch 38. The indicator lamp 34 is lit by the actuation of the microswitch 38.

Therefore, when the movable iron core 24 is moved to the right upon application of the DC magnetic field generated by the excitation of the coil 22 and the spool 16 is moved by the push pin 30-2, the push pin 30-1 coupled with the right side of the spool 16 pushes the switch knob 40 to thereby actuate the microswitch 38. The indicator lamp 34 is lit upon actuation of the microswitch 38, so that it is possible to confirm that the spool 16 has operated properly.

When the current supply to the coil 22 is stopped, the spool 16 is returned to the neutral position shown in the diagram by the forces of the springs 18-1 and 18-2.

However, the conventional electromagnetic directional control valve, which utilizes a mechanism for checking the operation of the valve by detecting the motion of the spool 16 by way of microswitch 38, has the following problems.

First, in the electromagnetic directional control valve in which the solenoid section 14 is attached on one side, for instance, the left side of the valve main body 10 as shown in the diagram, causes the overall size of the electromagnetic direction control valve to be larger than would otherwise be necessary. This will, in turn, require an enlarged area for installation of the valve.

Also, since the spool 16 is required to push the switch knob 40 of the microswitch 38, it is necessary that sufficient force is generated to depress the switch knob 40.

Further, the spacing between the push pin 30-1 and the switch knob 40 must be correctly adjusted so that the microswitch 38 is actuated when the spool 16 reaches a predetermined position. This spacing adjustment is complicated.

In addition, since the microswitch 38 is provided on one side of the valve main body 10, it is impossible to realize a construction in which the solenoid sections are attached to both sides of the valve main body 10 and, thus, in which the spool is switchable between three positions such as those which define straight, neutral and crossed fluid passages. That is, such a construction limits the valve to a two-position valve.

SUMMARY OF THE INVENTION

It is an object of the present invention to provide an electromagnetic directional control valve in which the correct operation of a spool is checked by detecting a change in the DC magnetic field which is generated when a solenoid coil is excited by supplying a DC voltage thereto.

Another object of the invention is to provide an electromagnetic directional control valve in which the correct operation of a spool is checked by a magnetic sensor which detects a change in the DC magnetic field.

Still another object of the invention is to provide an electromagnetic directional control valve in which the correct operation of a spool is checked by detecting an alternating field which is generated when a solenoid coil is excited by supplying an AC voltage thereto.

Still another object of the invention is to provide an electromagnetic directional control valve in which the correct operation of a spool is checked by a pickup coil which detects an alternating current field.

Still another object of the invention is to provide an electromagnetic directional control valve in which the correct operation of a spool is checked by a current transformer which detects an alternating current field.

That is, in an electromagnetic directional control valve of the type in which a DC voltage is supplied, a magnetic sensor using a magnetoresistive device is provided near a coil of a solenoid section, and an output of the magnetic sensor responsive to a DC magnetic field of the exciting coil is detected by a detecting circuit, such that it is possible to check whether the spool of the electromagnetic directional control valve has operated properly.

Alternatively, in an electromagnetic directional control valve of the type in which an AC voltage is applied, a pickup coil is provided near a coil of a solenoid section, an output voltage of the pickup coil which was induced by an alternating field generated by the excitation of the coil is detected by a detecting circuit to determine whether the alternating field lies within a predetermined range, such that it is possible to check whether a spool of the electromagnetic directional control valve has operated properly.

Similarly, in an electromagnetic directional control valve of the type in which an AC voltage is applied, the operation can be checked by providing a current transformer to detect an exciting current flowing through a coil of a solenoid section.

The above and other objects, features, and advantages of the present invention will become more apparent from the following detailed description in conjunction with the accompanying drawings.

DETAILED DESCRIPTION OF THE PREFERRED EMBODIMENTS

Figure 2:
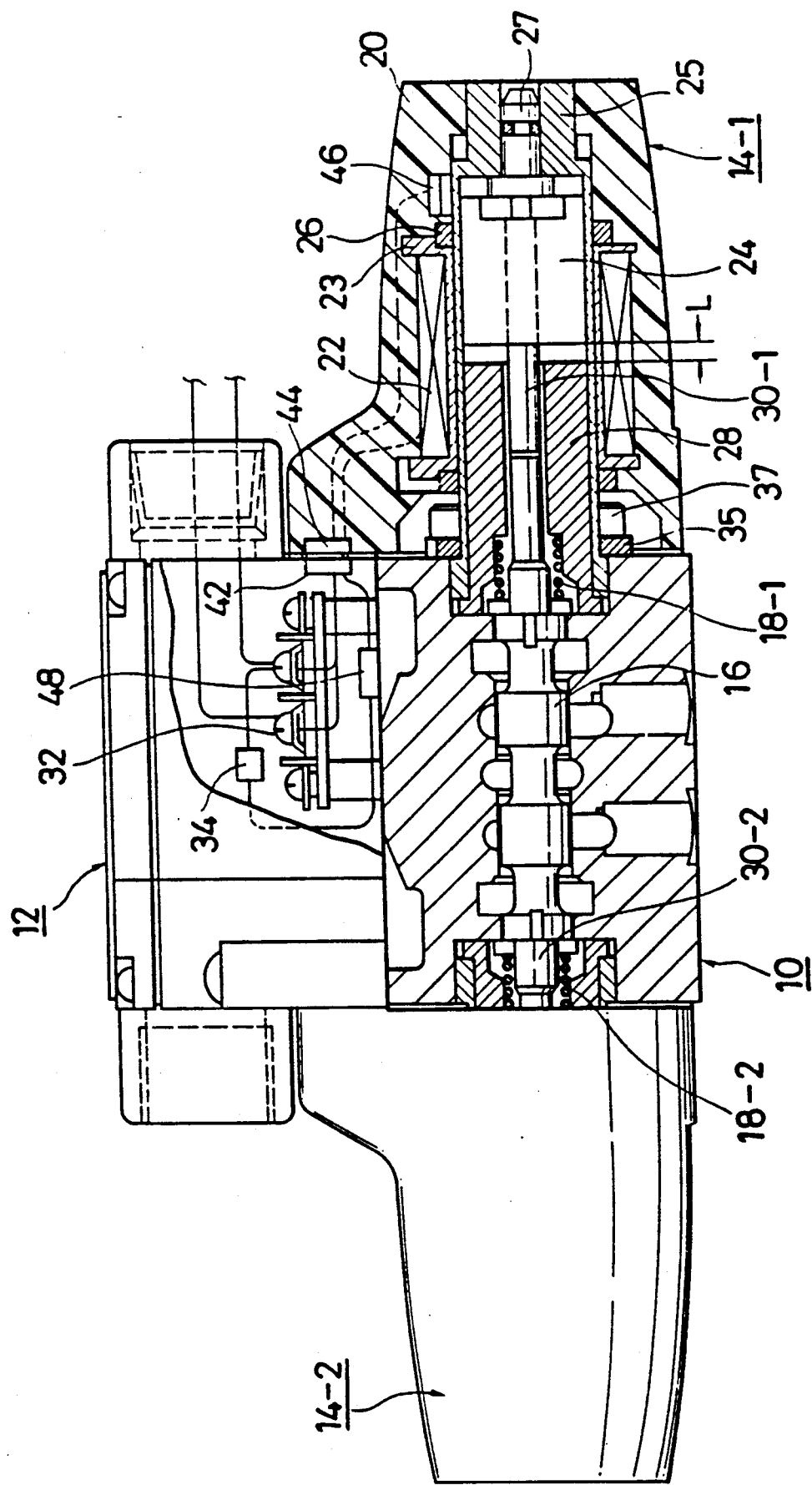
FIG. 2 is a cross sectional view showing an embodiment of a DC excitation type electromagnetic directional control valve according to the invention.

FIG. 2 is a cross sectional view showing an embodiment of the present invention as applied to a DC excitation type electromagnetic directional control valve.

In FIG. 2, the spool 16 is slidably assembled in the valve main body 10. The spool 16 is supported at the neutral position shown in the diagram by the springs 18-1 and 18-2 arranged on both sides of the spool 16. By supplying a current to the solenoid coil, the spool 16 is moved to the right or left of the neutral position, thereby switching the internal fluid passage.

The electrical equipment box 12 is attached onto the valve main body 10. In the box 12 are disposed a terminal plate 32 to which is connected a cable which is led in from the outside and an indicator lamp 34 which is lit when the spool is moved to the right or left position. Also provided is a plug 42 which is used to provide electrical connection with solenoid sections 14-1 and 14-2.

The solenoid sections 14-1 and 14-2 are attached to both sides of the valve main body 10. An internal structure of the solenoid section 14-1 on the right side is shown as a cross sectional view.

The solenoid section 14-1 has the casing 20 made of a synthetic resin material. The cylindrical coil 22 supported within the box-shaped coil frame 26 made of a permeable material is disposed within the hollow portion in the casing 20 and is wound around the coil bobbin 23. The core tube 25 is inserted into the coil 22. The movable iron core 24 which is slidable in the axial direction is arranged in the core tube 25. The fixed iron core 28 is spaced from the left side of the movable iron core 24 by a predetermined distance L. The fixed iron core 28 is fixed to the valve main body 10 by securing the core tube 25 to the valve main body 10 by way of flange 35 and screw 37. A through hole is formed at the center of the fixed iron core 28 in the axial direction. The push pin 30-1 whose one end is coupled with the spool 16 is movably inserted into the through hole. The left side of the push pin 30-1 is coupled with the movable iron core 24.

The coil 22 is connected to a terminal of the terminal plate 32 by a signal line which is connected to the plug 42 by a receptacle 44.

Although the structure of such an electromagnetic directional control valve is substantially the same as that of the conventional valve, it differs from the conventional valve in that it additionally includes a magnetic sensor 46 attached in the casing 20 near the right side of the coil frame 26 in the solenoid section 14-1. Furthermore, a detecting circuit 48 is installed in the box 12. The detecting circuit 48 is connected by a signal line to the magnetic sensor 46 of solenoid section 14-1 by way of the plug 42 and receptacle 44. A DC magnetic field generated by the coil 22 is detected by the magnetic sensor 46 so as to cause lighting of the indicator lamp 34 and transmittal of a detection signal to the outside as necessary. The solenoid section 14-2 is disposed on the side of the valve opposite solenoid section 14-1 and has substantially the same structure as the solenoid section 14-1.

The operation of the embodiment shown in FIG. 2 will now be described.

When a DC voltage is supplied from the outside, a DC current flows through the coil 22 which has a hollow cylindrical shape so as to generate a DC magnetic field and form a magnetic circuit through the coil frame 26, fixed iron core 28, and movable iron core 24. Therefore, a magnetic attractive force is generated between the fixed iron core 28 and the movable iron core 24 such that the movable iron core 24 is moved to the left against the forces of the springs 18-1 and 18-2. At the same time, the spool 16 is moved to the left by the push pin 30-1 and the passage in the valve main body 10 is switched. When the spool 16 moves to the switching position and stops, the resistance of the magnetic circuit in which the coil 22 is used as a magnetism generating source is minimized, while the magnetic field becomes maximum.

When the current supply to the coil 22 is stopped, the generation of the magnetic field is stopped and the movable iron core 24 and spool 16 are returned to the neutral position, shown in the diagram, by the forces of the springs 18-1 and 18-2.

When the coil 22 is excited by applying a DC voltage thereto, the magnetic flux which is generated through the coil frame 26 causes the magnetic sensor 46 arranged near the coil frame 26 to output an electric signal corresponding to the direction and magnitude of the DC magnetic field. An output of the magnetic sensor 46 is transmitted through the receptacle 44 and plug 42 and is input to the detecting circuit 48 provided in the box 12.

The detecting circuit 48 outputs an H level signal which is set to the logic level "1" when the output of the magnetic sensor 46 exceeds a predetermined threshold value $V_{ref}$, thereby lighting the indicator lamp 34 as an indication of the operation of the valve.

Alternatively, by transmitting the H level output signal of the detecting circuit 48 to the outside from the box 12 and affecting a display, the operation of the electromagnetic directional control valve can be confirmed from a remote position.

Figure 3:
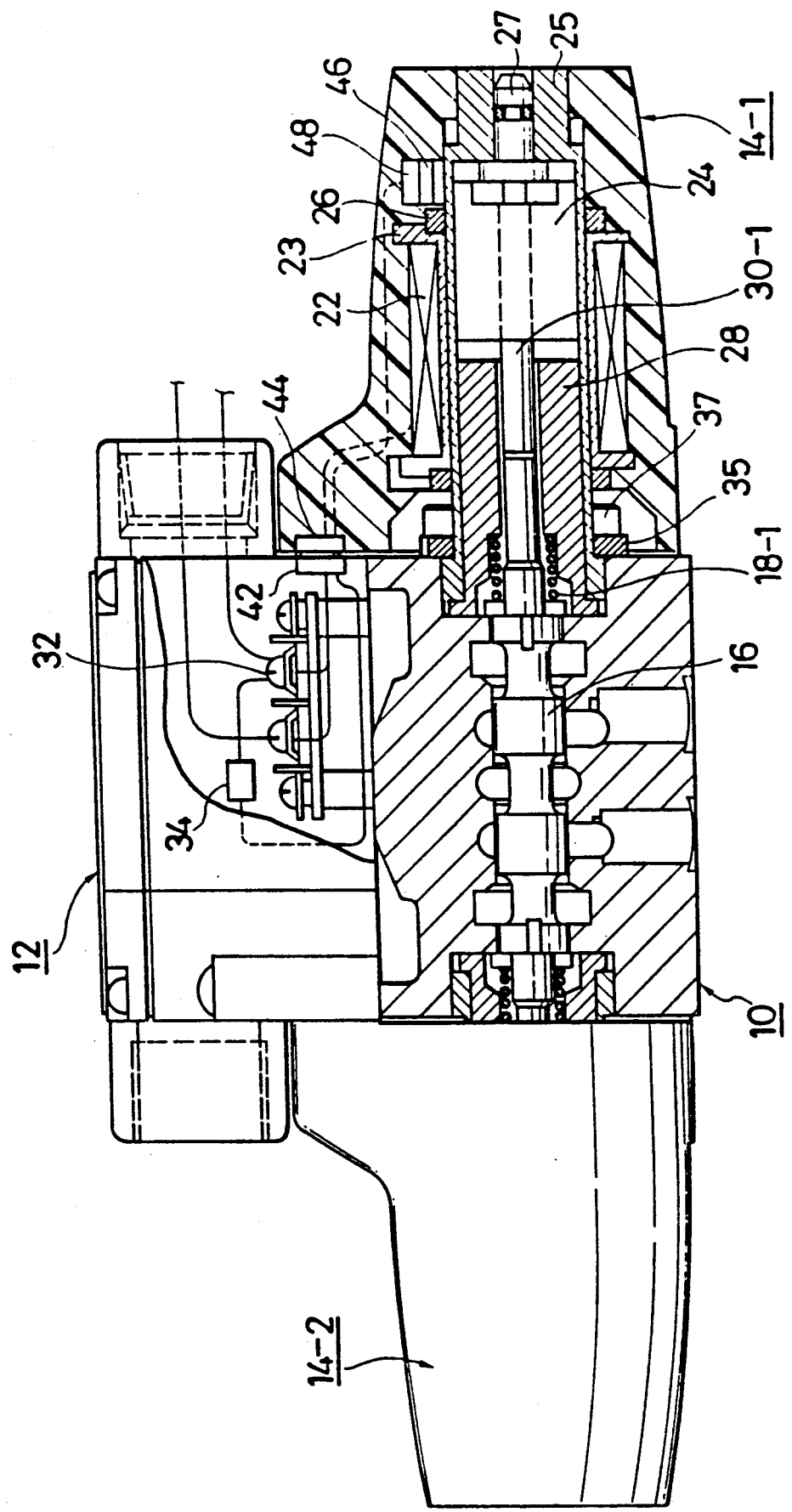
FIG. 3 is a cross sectional view showing another embodiment of a DC excitation type electromagnetic directional control valve.

FIG. 3 is a cross sectional view showing another embodiment of a DC excitation type electromagnetic directional control valve. The embodiment is characterized in that the detecting circuit 48 is arranged near the magnetic sensor 46 provided in the casing 20 of the solenoid section 14-1. In the embodiment of FIG. 3, the detecting circuit 48 is arranged near the magnetic sensor 46 so that the signal line leading from the sensor is short in length and erroneous detection signals due to noises are prevented.

Figure 4:
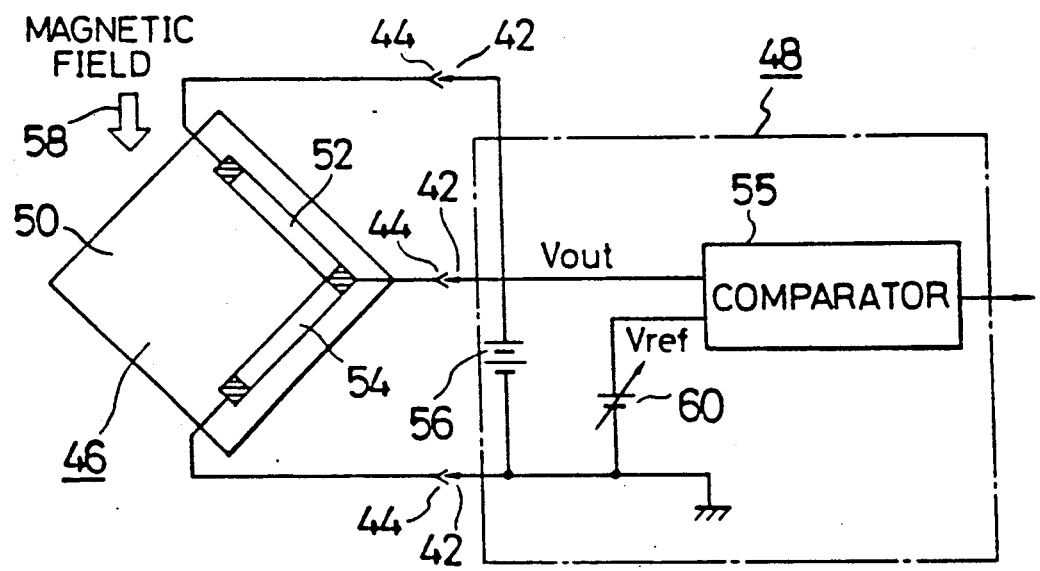
FIG. 4 is a schematic diagram of magnetic sensors and detecting circuits provided in the embodiments of FIGS. 2 and 3.

FIG. 4 shows a schematic illustration of the magnetic sensor 46 and detecting circuit 48 shown in each of FIGS. 2 and 3.

In FIG. 4, the magnetic sensor 46 is formed of a pair of magnetoresistive devices 52 and 54 made of thin films of a magnetic material whose resistance values change due to the influence of the magnetic field incident on a board 50. The magnetoresistive devices 52 and 54 are arranged so as to cross perpendicularly in a manner in which one end of each of the devices is commonly used. A predetermined voltage of a DC power source 56 provided for the detecting circuit 48 is applied to both ends of the devices 52 and 54.

Practically speaking, the magnetoresistive devices 52 and 54 are formed by thin films made of a ferromagnetic metal such as Fe-Ni or Co-Ni.

When the magnetoresistive devices 52 and 54 are assembled in the casing 20 as shown in FIGS. 2 and 3, a magnetic field is applied to the devices 52 and 54 from a direction shown by an arrow 58 (FIG. 4). The resistance values of the devices 52 and 54 change in accordance with the direction and intensity of the magnetic field. Therefore, a divided voltage, based on the resistance values of the two magnetoresistive devices 52 and 54 and proportional to the DC magnetic field which changes depending on the motion of the movable iron core 24, is derived from the magnetic sensor 46.

In this case, since the output of the magnetic sensor 46 is a differential output, the fluctuation components of the resistance values due to a change in ambient temperature are offset and a stable output which is not influenced by the ambient temperature is obtained.

The output of the magnetic sensor 46 is input to a comparator 55 in the detecting circuit 48 and is compared with the threshold voltage $V_{ref}$ which is set by the reference voltage source 56.

That is, an output voltage is obtained by dividing a predetermined voltage from the DC power source 56 by the resistance values of the magnetoresistive devices 52 and 54 which make up the magnetic sensor 46. By setting the threshold value $V_{ref}$ to a value which is significantly smaller than the output of the magnetic sensor 46 when the movable iron core 24 is located at a predetermined operating position, for instance, at the position where the movable iron core 24 is in contact with the fixed iron core 28, it is possible to detect, by a comparison output from the comparator 55 in the detecting circuit 48, whether or not the movable iron core has moved into contact with the fixed iron core 28. That is, whether or not the spool 16 of the electromagnetic directional control valve has moved to the correct position can be detected.

Figure 5:
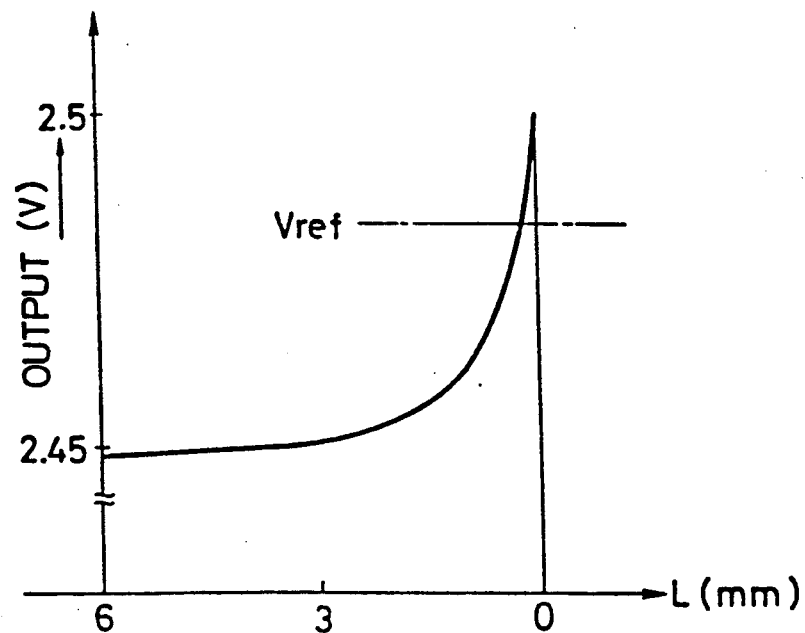
FIG. 5 is a diagram illustrating output characteristics of the magnetic sensor in FIG. 4.

FIG. 5 shows an example of an operating characteristic of the magnetic sensor 46. That is, as shown in FIGS. 2 and 3, a spacing L is provided between the movable iron core 24 and the fixed iron core 28 in the inoperative mode in which the spool is located at the neutral position. The graph in FIG. 5 shows the change which occurs in the output voltage $V_{out}$ of the magnetic sensor 46 when the movable iron core 24 moves due to the DC excitation of the coil 22 and the interval L changes from 6 mm to 0 mm.

As will be obvious from FIG. 5, when the movable iron core 24 approaches the position at which the movable iron core 24 comes into contact with the fixed iron core 28 (L=0 mm), the output $V_{out}$ of the magnetic sensor 46 suddenly increases due to the increase in intensity of the magnetic field passing through the magnetic sensor 46. Therefore, by setting the threshold value $V_{ref}$ for the detecting circuit 48 to a level shown in the graph which is lower than the sensor output when L=0 mm, operation of the movable iron core 24 to move the spool 16 to the correct position can be detected.

An attractive force F between the fixed iron core 28 and the movable iron core 24 in the solenoid section 14-1 is obtained by the following equation.

$$F = K \cdot (N \cdot I / x)^2 \cdot S$$

where,
K: constant,
N: the number of turns of the coil,
x: stroke of the movable iron core,
I: coil exciting current,
S: area of the absorbing section.

Therefore, the stroke position of the movable iron core 24 corresponds to the output of the magnetic sensor 46. By monitoring the sensor output, the operation of the electromagnetic directional control valve can be correctly detected.

Figure 6:
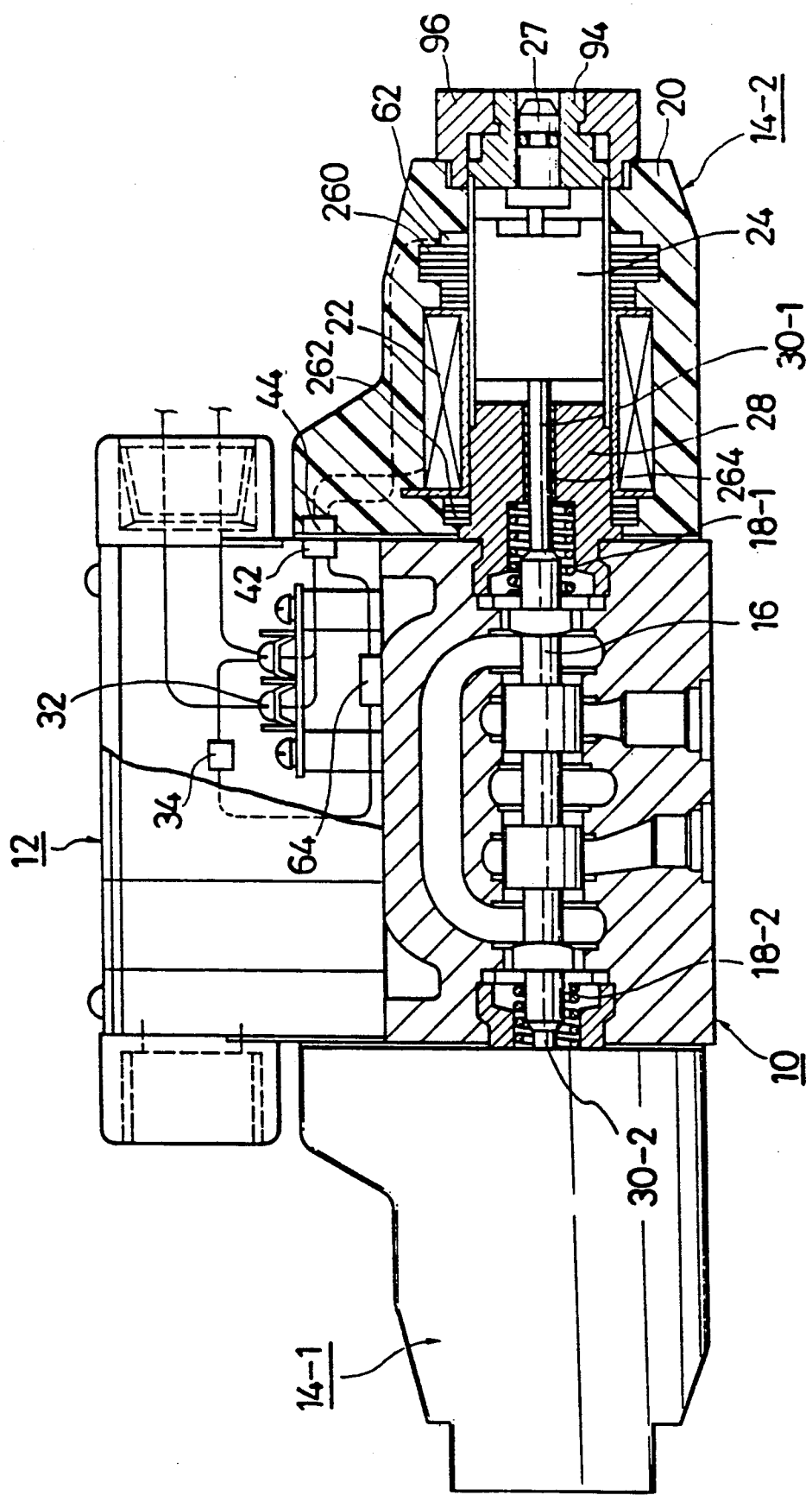
FIG. 6 is a cross sectional view showing an embodiment of an AC excitation type electromagnetic control valve according to the invention.

FIG. 6 is a cross sectional view showing an embodiment of the present invention which is applied to an AC excitation type electromagnetic directional control valve.

In FIG. 6, as shown in the solenoid section 14-1 on the left side of the valve main body 10, the coil 22 wound around a coil bobbin is assembled into the casing 20 made of a synthetic resin material. The coil 22 is supported by coil frames 260 and 262 made of a permeable material. The coil frames 260 and 262 are formed of silicon steel plates. A pickup coil 62 is arranged near the coil frame 260. The pickup coil 62 has a structure in which a coil is wound a predetermined number of times around an iron core having a high permeability. When an alternating field is applied to the pickup coil 62 by the AC excitation of the coil 22, it generates an inductive voltage.

A detecting circuit 64 is provided in the electrical equipment box 12 arranged on the valve main body 10. A signal line which is led out from the pickup coil 62 provided in the solenoid section 14-1 is connected to the detecting circuit 64 through the receptacle 44 and plug 42. When an output voltage of the pickup coil 62 is within a predetermined threshold range, the detecting circuit 64 generates a detection output signal and lighting of the indicator lamp 34 and, if necessary, sends a detection signal to the outside.

Figure 1:
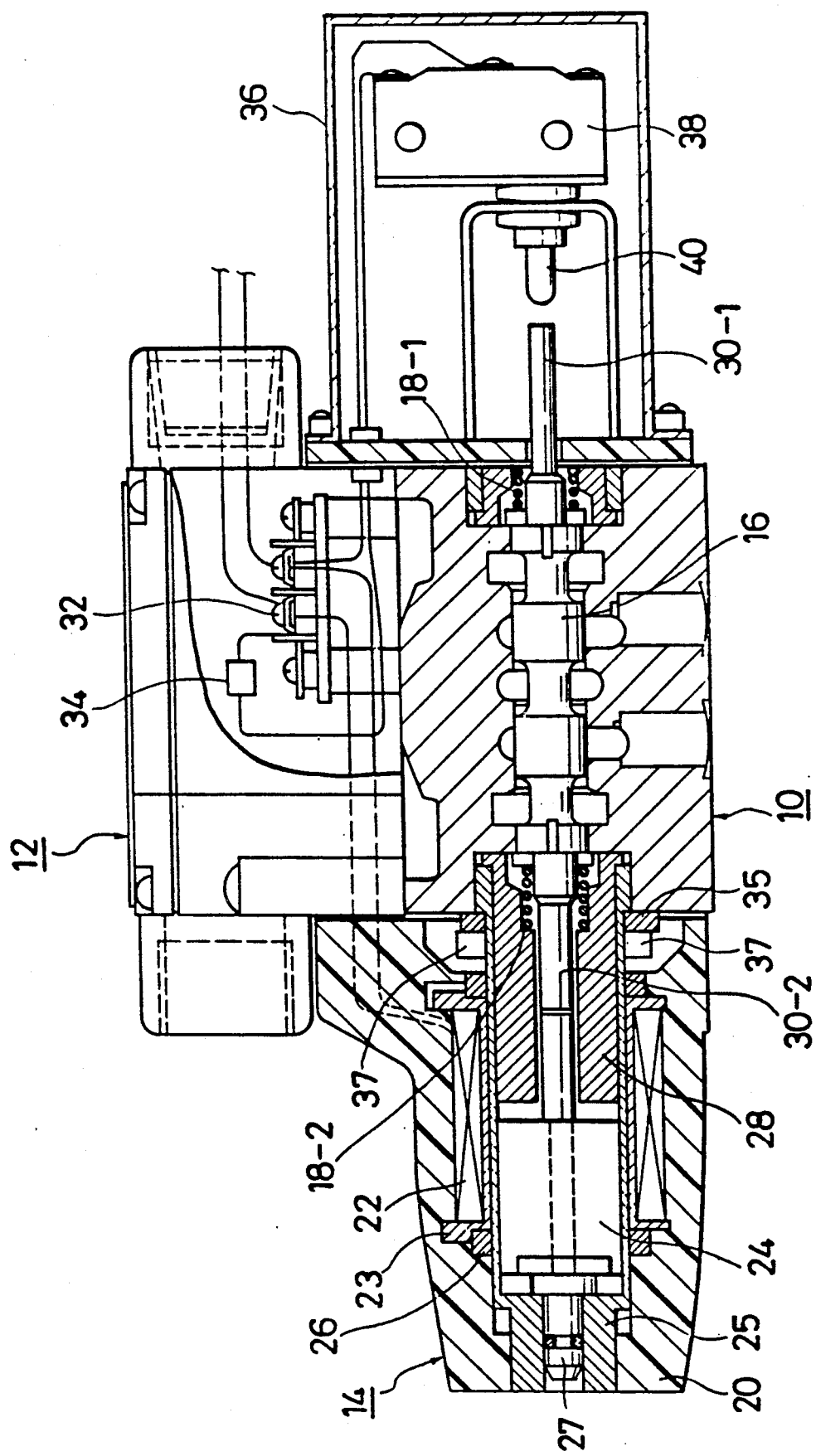
FIG. 1 is a cross sectional view of a conventional electromagnetic directional control valve.

The remainder of the structure shown in FIG. 6 is substantially the same as that shown in the embodiment of FIGS. 1 and 2 except that in the embodiment of FIG. 6 the fixed iron core 28 and movable iron core 24 in the solenoid section 14-2 are assembled into the casing 20 by a different core tube 264, a screw plug 96, and plugs 94 and 27.

Figure 7:
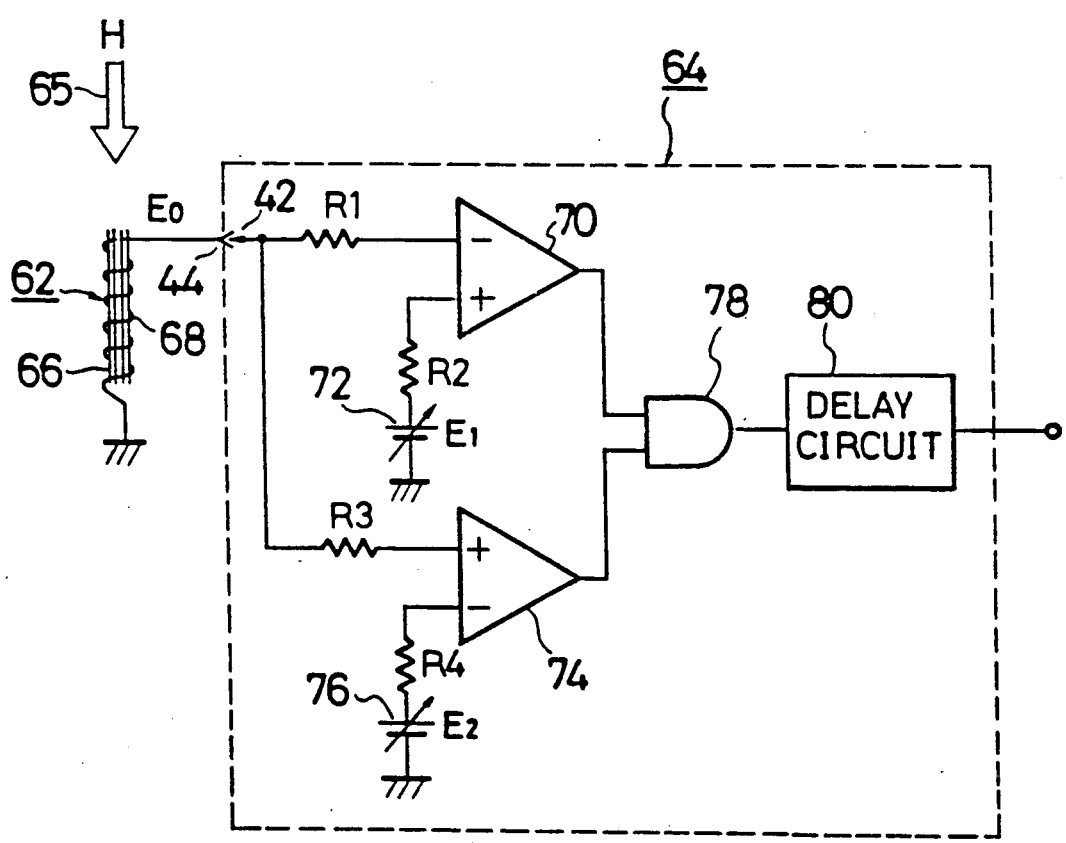
FIG. 7 is a schematic diagram of a pickup coil and a detecting circuit in the embodiment of FIG. 6.

FIG. 7 schematically illustrates the pickup coil 62 and detecting circuit 64 of the embodiment shown in FIG. 6.

In FIG. 7, the pickup coil 62 is constructed by winding a coil 68 around a rod-shaped iron core 66 having a high permeability. When an alternating field H is applied by the AC excitation of coil 22 (FIG. 6) to the pickup coil 62 from a direction indicated by an arrow 65, the pickup coil 62 induces an AC voltage in the coil 68.

The detecting circuit 64 has a first comparator 70 and a second comparator 74. An output voltage $E_0$ of the pickup coil 62 is applied to a negative input terminal of the first comparator 70 through a resistor $R_1$ and is also applied to a positive input terminal of the second comparator 74 through a resistor $R_3$. A first threshold voltage $E_1$ is applied from a reference voltage source 72 to a positive input terminal of the comparator 70 through a resistor $R_2$ and a second threshold voltage $E_2$ is applied from a reference voltage source 76 to a negative input terminal of the comparator 74 through a resistor $R_4$. The threshold voltages $E_1$ and $E_2$ are set so that $E_1 < E_2$. When the output voltage $E_0$ of the pickup coil 62 is within a range between the threshold voltage $E_1$ and the threshold voltage $E_2$, both of the comparators 70 and 74 generate H level outputs. That is, the comparators 70 and 74 define a window comparator.

The output of the comparators 70 and 74 are input to an AND gate 78. An output of the AND gate 78 is input to a delay circuit 80. An output of the delay circuit 80 becomes a final detection output of the detecting circuit 64.

The operation of the embodiment of FIG. 6 will now be described.

When an AC voltage is applied from the outside to the coil of the solenoid section 14-1, an AC exciting current flows through the coil 22, so that an alternating field is generated. A magnetic flux H of the alternating field generated by the excitation of the coil 22 interlinks the pickup coil 62 as shown in FIG. 7. The voltage induced in the coil 68 is input to the detecting circuit 64.

Figure 8:
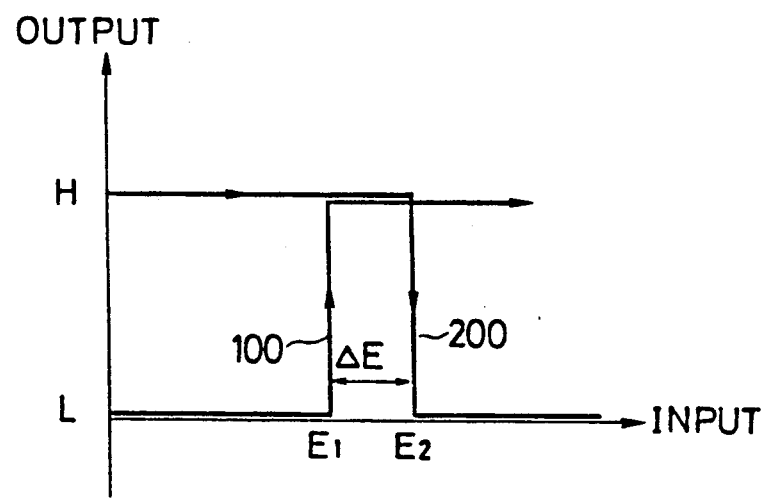
FIG. 8 is a diagram illustrating input/output characteristics of the detecting circuit in FIG. 7.

FIG. 8 shows input/output characteristics of the comparators 70 and 74 provided in the detecting circuit 64. An axis of abscissa denotes an input as an output voltage $E_0$ of the pickup coil 62 and an axis of ordinate indicates an output which is set to a logic level H or L.

As will be obvious from FIG. 8, since there is the relation of $E_1 < E_2$ between the threshold voltages $E_1$ and $E_2$ for the comparators 70 and 74, the logic outputs of the comparators 70 and 74 are set as follows for the inductive voltage $E_0$ of the pickup coil 62.

|  | Comparator 70 | Comparator 74 |
| --- | --- | --- |
| $E_0 < E_1$ | L | H |
| $E_1 < E_0 < E_2$ | H | H |
| $E_2 < E_0$ | H | L |

Therefore, when the inductive voltage $E_0$ of the pickup coil 62 lies within the range between the threshold values $E_1$ and $E_2$, the outputs of the comparators 70 and 74 are set to the H level and an H level output is derived from the AND gate 78. The H level output signal is delayed by the delay circuit 80 by a time corresponding to the response time from the start of the excitation of the coil 22 to the completion of the switching of the spool 16. Thereafter, the H level output is obtained from the detecting circuit 64. The indicator lamp 34 is caused to light by the H level output, thereby indicating that the electromagnetic directional control valve has operated.

Figure 9:
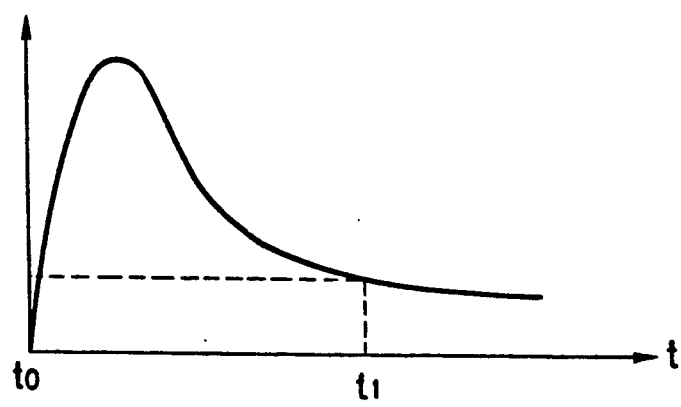
FIG. 9 is a diagram illustrating detecting characteristics of the pickup coil in FIG. 7.

FIG. 9 shows a time-dependent change of the inductive voltage of the pickup coil 62 upon application of the AC voltage to the coil 22 for moving the movable iron core 24.

As shown in FIG. 6, the pickup coil 62 is arranged near the coil frame 260 formed of silicon steel plates having a high permeability. The movable iron core 24 is attracted to the fixed iron core 28 upon the formation of the magnetic circuit due to the alternating field generated by the AC excitation of the coil 22. At the same time, the spool 16 is also pushed by the movable iron core 24 through the push pin 30-1 and is moved left from the neutral position shown in the diagram to the left switching position.

The density of the magnetic flux which passes through the pickup coil 62 becomes maximum soon after initial movement of the movable iron core 24 due to the AC excitation of the coil 22 at time $t_0$ in FIG. 9. The inductive voltage $E_0$ of the pickup coil 62 correspondingly rises to the peak level. As the movable iron core 24 approaches the fixed iron core 28, the density of the magnetic flux passing through the pickup coil 62 decreases. When the movable iron core 24 comes into contact with the fixed iron core 28 at time $t_1$ and the spool 16 stops at the switching position, the magnetic flux density is held at a predetermined value. Therefore, the inductive voltage of the pickup coil 62 becomes almost stable at a predetermined level after time $t_1$.

Therefore, by setting the threshold voltages $E_1$ and $E_2$, which are set for the comparators 70 and 74 in the detecting circuit 64 in FIG. 7, to values which are higher and lower, respectively, than the predetermined level of the stable voltages of the pickup coil 62 after time $t_1$ in FIG. 9, the movement of the movable iron core 15 upon the AC excitation of the coil 22, and the motion of the spool 16, can be correctly detected.

On the other hand, when the coil 22 is excited and the movable iron core 24 does not move due to sticking or the like of the spool 16, the inductive voltage $E_0$ of the pickup coil 62 is stabilized at a voltage outside the range between the threshold voltages $E_1$ and $E_2$ and no detection output is derived from the detecting circuit 64.

The inductive voltage $E_0$ of the pickup coil 62 is given by the following equation.

$$E_0 = K \cdot f \cdot N \cdot S \cdot B_m$$

where,
K: constant,
f: AC frequency,
S: effective cross sectional area of the core,
$B_m$: maximum magnetic flux density,
N: the number of turns of the coil.

Since the inductive voltage $E_0$ of the pickup coil 62 depends on the intensity of the magnetic flux, a signal is obtained which corresponds to the level of the magnetic flux which interlinks upon operation of the movable iron core 24.

The attractive force F is given by the following equation.

$$F = K_0 \cdot B_M^2 \cdot S (1 - \cos 2\omega t)$$

where,
$K_0$: constant,
$\omega$: angular frequency,

Although the coil 22 pulsates at the frequency which is twice as high as the frequency of the AC power source and generates noises, pulsation of the attracting force can be reduced by providing a shading coil or the like.

Although only one pickup coil 62 has been provided in the embodiment of FIG. 6, a change in magnetic flux can be detected at a higher sensitivity by using a plurality of pickup coils arranged near the coil frame 260. In such an arrangement, output voltages of the pickup coils are added and the resultant voltage is input to the detecting circuit 64.

Figure 10:
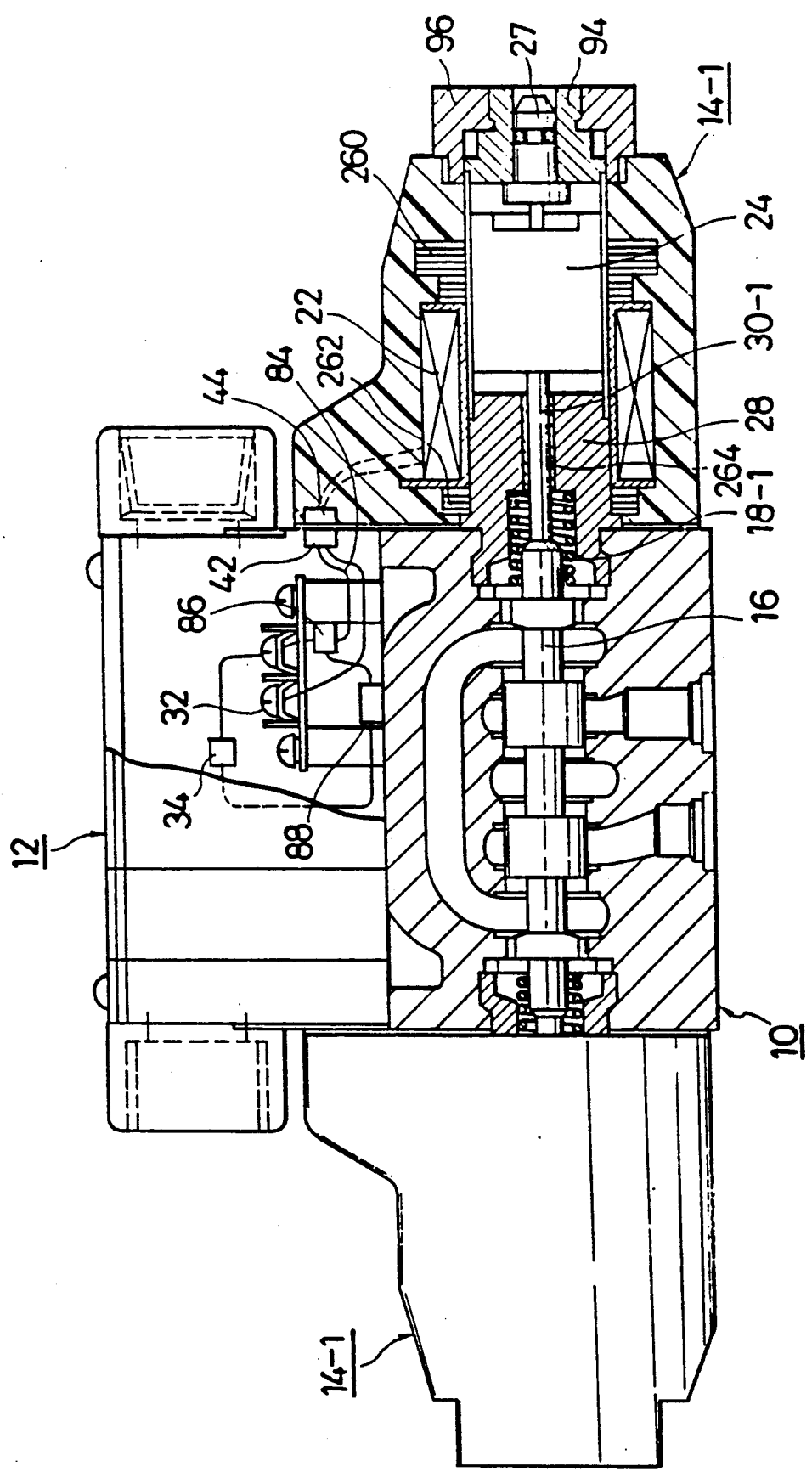
FIG. 10 is a cross sectional view showing another embodiment of an AC excitation type electromagnetic control valve.

FIG. 10 is a cross sectional view showing another embodiment of an AC excitation type electromagnetic directional control valve according to the invention. The embodiment is characterized in that current flowing through the coil 22 provided in the solenoid section 14-1 is detected by a current transformer.

In FIG. 10, an AC voltage is supplied from the terminal plate 32 provided in the electrical equipment box 12 to the coil 22 in the solenoid section 14-1 by connecting a lead wire 84 from the terminal plate 33 to the plug 42 and by, further, connecting a signal line from the receptacle 44 to the coil 22.

A current transformer 86 is attached to the lead wire 84 to connect the terminal plate 32 to the plug 42. As will be clearly described hereinafter, the current transformer 86 has a structure such that a primary conductor through which an exciting current flows is pierced into a ring-shaped iron core having a high permeability. A secondary coil is wound around the ring-shaped iron core. A voltage proportional to the AC exciting current flowing through the primary conductor is induced in the secondary coil.

An output of the current transformer 86 is input to a detecting circuit 88 (FIG. 11) and the operation of the electromagnetic directional control valve is detected.

The remainder of the structure of the electromagnetic valve is substantially the same as that in the embodiment of FIG. 6.

Figure 11:
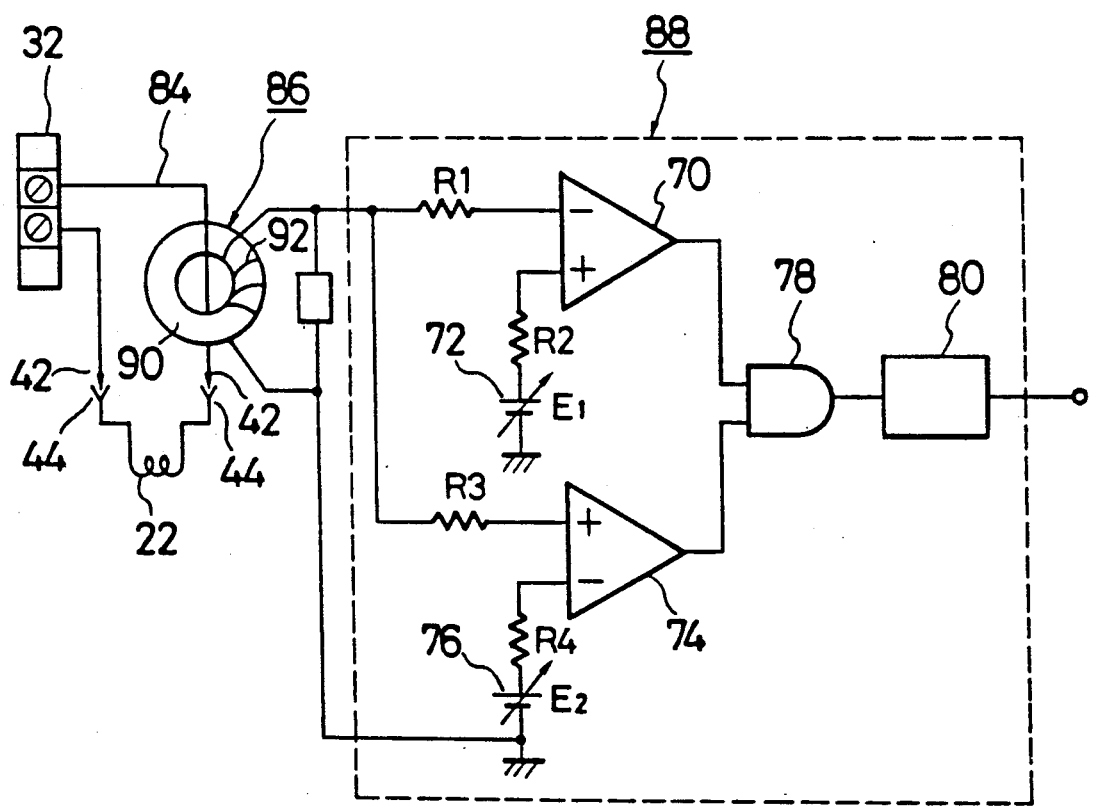
FIG. 11 is a schematic diagram of a current transformer (i.e. current detecting transformer) and a detecting circuit utilized in the embodiment of FIG. 10.

FIG. 11 schematically illustrates the current transformer 86 and detecting circuit 88 of the embodiment shown in FIG. 10.

In FIG. 11, the current transformer 86 is constructed in a manner such that the lead wire 84 to the coil 22 is used as a primary conductor, the primary conductor 84 is pierced into a ring-shaped iron core 90 having a high permeability, and a secondary coil 92 is wound around the iron core 90.

The comparator 88 has the same circuit construction as the comparator 74 in FIG. 7. The threshold voltages $E_1$ and $E_2$ which are input into the comparators 70 and 74 by the reference voltage sources 72 and 76 have values which are peculiar to the current transformer 86.

Figure 12:
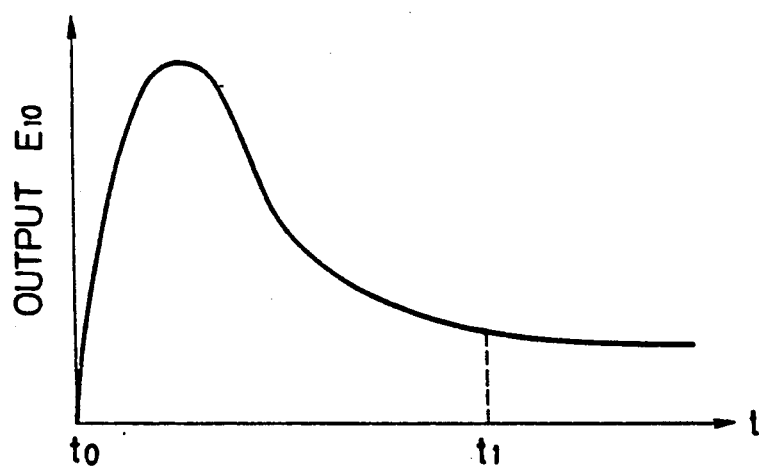
FIG. 12 is a diagram illustrating detecting characteristics of the current transformer in FIG. 11.

FIG. 12 shows a time-dependent change in output voltage $E_{10}$ of the current transformer 86 upon application of AC power to the coil 22.

When an AC voltage is applied to excite the coil 22 at time $t_0$ in FIG. 12, the movable iron core 24 is attracted toward the fixed iron core 28 and the inductive voltage $E_{10}$ is generated in the current transformer 86. That is, the magnetic field according to Ampere's cork screw rule is generated around the primary conductor 84 by the exciting current flowing through the primary conductor 84. The voltage $E_{10}$ is induced in the secondary coil 92 of the iron core 90 in accordance with the changing excitation current. The spool 16 is caused to move simultaneously with the movement of the movable iron core 24. The excitation current to the coil 22 also changes in accordance with the magnetoresistance of the magnetic circuit due to the movement of the movable iron core 24. That is, there is shown a transient response such that the inductive voltage $E_{10}$ of the secondary coil 92 of the current transformer 86 rises to the peak level after time $t_0$ and, thereafter, it decreases. When the movable iron core 24 comes into contact with the fixed iron core 28 at time $t_1$ and the spool 16 stops, the inductive voltage of the secondary coil 92 is stabilized at a predetermined value.

Therefore, by setting the threshold voltages $E_1$ and $E_2$ for the comparators 70 and 74 in FIG. 11 to values which are higher and lower, respectively, than the predetermined voltage after time $t_1$ in FIG. 11, it is possible to detect whether or not the electromagnetic directional control valve has correctly operated on the basis of the exciting current of the coil 22.

The ratio between the maximum current and the stationary current of the exciting current flowing through the coil 22 is generally about 5:1.

Figure 13:
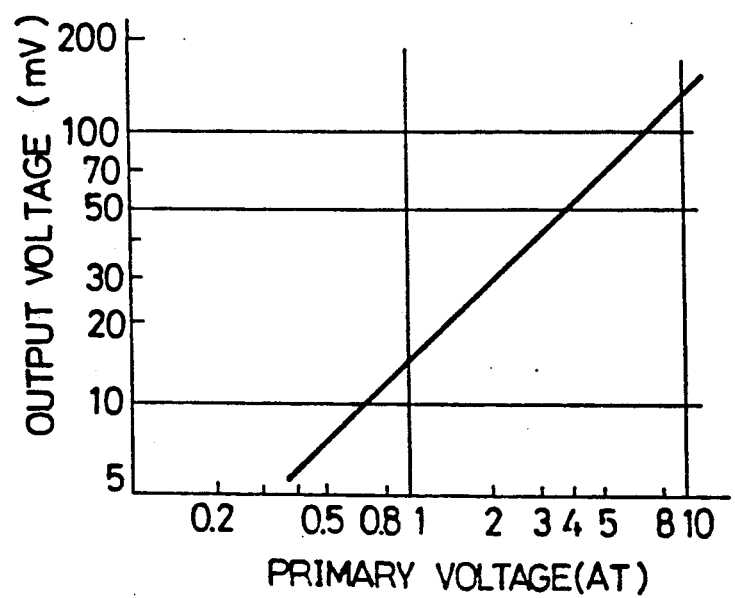
FIG. 13 is a diagram illustrating input/output characteristics of the current transformer in FIG. 11.

FIG. 13 shows the relation between an ampere-turn (AT) due to the current supply to the primary conductor 84 of the current transformer 86 and the inductive voltage $E_{10}$ of the secondary coil 92. Since a value of 5 or more is obtained as a dynamic range of the current transformer 86, the operation of the electromagnetic directional control valve can be correctly detected by detecting the exciting current or the coil 22.

On the other hand, when the excitation current flows through the coil 22 but the movable iron core 24 does not correctly operate due to sticking of the spool or the like, the magnetoresistance value is different from a prescribed value and the value of the exciting current flowing through the primary conductor 84 also differs from a prescribed value. Therefore, the inductive voltage $E_{10}$ of the current transformer 86 which lies within the range between the threshold voltages $E_1$ and $E_2$ is not obtained and no detection output is derived from the detecting circuit 88. Thus, the abnormality of the operation is detected.

What is claimed is:

1. An electromagnetic directional control valve which is switched and operated by applying an AC voltage, comprising:
    a valve main body, which has a spool that is movable in an axial direction from a neutral position to at least one other predetermined position, for switching an internal passage;
    electromagnetic driving means, having at least one movable core attached to one side of the spool provided in said valve main body and at least one coil in surrounding relation to said at least one movable core, for switching and moving the spool in the valve main body to a predetermined position by an AC electromagnetic force generated by an AC excitation of said at least one coil;
    magnetism detecting means for detecting an intensity of an alternating field which changes in accordance with the movement of said at least one movable core and for producing a detected magnetism output;
    detecting circuit means for generating a detection output when said detected magnetism output of said magnetism detecting means lies within a predetermined range; and
    display means for displaying that the valve main body has correctly operated on the basis of the detected magnetism output of said detecting circuit means.

2. A valve according to claim 1, wherein said magnetism detecting means comprises a pickup coil formed by a coil wound around a rod-shaped iron core having a high permeability through which the alternating field generated by the AC excitation of said at least one coil passes.

3. A valve according to claim 1, wherein said magnetism detecting means comprises a current transformer which includes a primary conductor extending through a ring-shaped iron core having a high permeability, and a secondary coil wound around said iron core, said primary conductor being defined by a lead wire adapted to supply an AC exciting current to said at least one coil.

4. A valve according to claim 1, wherein said detecting circuit means comprises:
    a first comparator which generates an L level output when a detection voltage of said magnetism detecting means is smaller than a first threshold voltage and which generates an H level output when said detection voltage is equal to or larger than said first threshold voltage;
    a second comparator which generates an H level output when the detection voltage of the magnetism detecting means is equal to or smaller than a second threshold voltage higher than said first threshold voltage and which generates an L level output when said detection voltage is larger than said second threshold voltage;
    an AND gate for obtaining an AND of the outputs of said first and second comparators; and
    a delay circuit to delay an output of said AND gate by a time corresponding to an operating time from the current supply to said at least one coil to the completion of the switching of said spool to said predetermined position.

* * * * *